US010705556B2

(12) United States Patent
Kapur et al.

(10) Patent No.: US 10,705,556 B2
(45) Date of Patent: Jul. 7, 2020

(54) PHASE CONTINUOUS SIGNAL GENERATION USING DIRECT DIGITAL SYNTHESIS (71) Applicant: International Business Machines Corporation, Armonk, NY (US)

(72) Inventors: Mohit Kapur, Tarrytown, NY (US); Muir Kumph, Croton on Hudson, NY (US); Jiri Stehlik, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/721,071

(22) Filed: Sep. 29, 2017

(65) Prior Publication Data

US 2019/0101950 A1  Apr. 4, 2019

(51) Int. Cl.
*G06F 1/02* (2006.01)
*G06F 1/03* (2006.01)

(52) U.S. Cl.
CPC ............ *G06F 1/022* (2013.01); *G06F 1/0321* (2013.01)

(58) Field of Classification Search
CPC ................................ G06F 1/022; G06F 1/0321
See application file for complete search history.

(56) References Cited

U.S. PATENT DOCUMENTS

| | | | |
|---|---|---|---|
| 5,714,954 A * | 2/1998 | Chung | G06F 1/0321 341/147 |
| 5,839,099 A | 11/1998 | Munsell | |
| 6,405,147 B1 | 6/2002 | Fera | |
| 6,489,911 B1 | 12/2002 | O'Dwyer | |
| 7,079,058 B2 | 7/2006 | Efland et al. | |
| 7,960,995 B2 | 6/2011 | Asami | |
| 8,045,670 B2 | 10/2011 | Waheed | |
| 8,548,016 B2 | 10/2013 | Wagner | |
| 8,792,581 B2 | 7/2014 | Mu | |
| 9,054,762 B2 | 6/2015 | Mirzaei | |
| 9,385,798 B1 * | 7/2016 | Marr | H04K 3/42 |
| 9,520,831 B1 * | 12/2016 | Foster | G06F 1/0321 |
| 2004/0246047 A1 | 12/2004 | Manku | |

(Continued)

FOREIGN PATENT DOCUMENTS

| | | |
|---|---|---|
| EP | 1873612 | 1/2008 |
| EP | 2701032 | 2/2014 |

(Continued)

OTHER PUBLICATIONS

International Application No. PCT/EP2017/080559 International Search Report and Written Opinion dated Jul. 11, 2018, 16 pages.

(Continued)

*Primary Examiner* — Chuong D Ngo
(74) *Attorney, Agent, or Firm* — Erik K. Johnson (57) ABSTRACT An aspect includes a direct digital synthesis system including a waveform generator with a waveform memory operable to store a plurality of waveform vectors and output a selected waveform vector. The direct digital synthesis system also includes a digital-to-analog converter operable to convert the selected waveform vector from a digital value to an analog signal responsive to a reference clock. The direct digital synthesis system further includes a controller operable to maintain phase continuity of the analog signal when an output of the analog signal is interrupted and restored.

25 Claims, 7 Drawing Sheets

(56) References Cited

U.S. PATENT DOCUMENTS

| | | |
|---|---|---|
| 2005/0248374 A1* | 11/2005 | Kushnick .......... G01R 31/31907 327/105 |
| 2008/0005213 A1 | 1/2008 | Holtzman |
| 2010/0066994 A1 | 3/2010 | Petrov |
| 2011/0032632 A1 | 2/2011 | Erden |
| 2011/0051790 A1 | 3/2011 | Honda |
| 2011/0076131 A1 | 3/2011 | Stabley |
| 2011/0199127 A1* | 8/2011 | Turner ................ G06F 1/0335 327/105 |
| 2011/0300885 A1 | 12/2011 | Darabi |
| 2012/0041720 A1 | 2/2012 | Pupalaikis |
| 2012/0183110 A1 | 7/2012 | Kolze |
| 2012/0264377 A1 | 10/2012 | Seekebfreund et al. |
| 2013/0021193 A1 | 1/2013 | Hermsen |
| 2013/0300460 A1 | 11/2013 | Gabbay |
| 2014/0028482 A1 | 1/2014 | Pupalaikis |
| 2014/0240004 A1 | 8/2014 | Fawley et al. |
| 2015/0180416 A1 | 1/2015 | Fernandez |
| 2015/0097571 A1 | 4/2015 | Wei |
| 2015/0358049 A1 | 12/2015 | Bonicatto |
| 2016/0014341 A1 | 1/2016 | Miyahara |
| 2016/0050010 A1 | 2/2016 | Buehler et al. |
| 2016/0087783 A1 | 3/2016 | Lin et al. |
| 2016/0233877 A1 | 8/2016 | Pupalakis |
| 2017/0038263 A1 | 2/2017 | Fury |
| 2017/0250700 A1 | 8/2017 | Pupalaikis |

FOREIGN PATENT DOCUMENTS

| | | |
|---|---|---|
| WO | 2006125193 A2 | 11/2006 |
| WO | 2013165293 A1 | 11/2013 |

OTHER PUBLICATIONS

"AWG—Arbitrary Waveform Generator Basics", RF Wireless World, 2012, http://www.rfwireless-world.com/Articles/AWG-Arbitrary-Waveform-Generator-basics-and-types.html, Accessed Nov. 13, 2017 (5 pp.).

International Search Report and Written Opinion, International Application No. PCT/EF2017/080313; International Filing Date: Nov. 24, 2017, dated Aug. 10, 2018; 12 pages.

Stephanie Overhoff, "Direct-Sampling DACs in Theory and Application", https://www.maximintegrated.com/en/app-notes/index.mvp/id/5446, Jun. 20, 2013, 5 pages.

* cited by examiner

PHASE CONTINUOUS SIGNAL GENERATION USING DIRECT DIGITAL SYNTHESIS

BACKGROUND

The present invention generally relates to arbitrary waveform generators, and more specifically, to direct digital synthesis systems.

In various applications, it is useful to generate phase coherent analog signals and provide for a way to switch these signals on and off. Digitally synthesized signals are typically limited by a number of factors. When signals are digitally synthesized, processing systems may constrain the ability to directly produce high frequencies (e.g., over 2 GHz) as well as consistently maintaining timing of desired waveforms due to processing system exceptions, interrupts, variability in processing loads, and the like. One approach to creating higher frequency phase coherent signals includes using standard radio frequency generator (RF) and RF switches; however, RF switches can be difficult to accurately control, can consume a large amount of power, and increase thermal loads.

SUMMARY

Embodiments of the present invention are directed to a direct digital synthesis system. A non-limiting example of the direct digital synthesis system includes a waveform generator with a waveform memory operable to store a plurality of waveform vectors and output a selected waveform vector. The direct digital synthesis system also includes a digital-to-analog converter operable to convert the selected waveform vector from a digital value to an analog signal responsive to a reference clock. The direct digital synthesis system further includes a controller operable to maintain phase continuity of the analog signal when an output of the analog signal is interrupted and restored.

Embodiments of the present invention are directed to a method of direct digital synthesis. A non-limiting example of the method includes outputting a selected waveform vector from a waveform generator that includes a waveform memory operable to store a plurality of waveform vectors. The selected waveform vector is converted from a digital value to an analog signal using a digital-to-analog converter responsive to a reference clock. Phase continuity of the analog signal is maintained when an output of the analog signal is interrupted and restored.

Embodiments of the present invention are directed to a computer program product. A non-limiting example of the computer program product includes a computer readable storage medium having program instructions embodied therewith. The program instructions are executable by processing circuitry to cause the processing circuitry to control a waveform generator to output a selected waveform vector. The waveform generator includes a waveform memory operable to store a plurality of waveform vectors. A digital-to-analog converter is controlled to convert the selected waveform vector from a digital value to an analog signal responsive to a reference clock. Phase continuity of the analog signal is maintained when an output of the analog signal is interrupted and restored.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, direct digital synthesis is a form of arbitrary waveform generation which implements a memory unit to feed waveform sample data to a high-speed digital-to-analog converter. The analog output of the digital-to-analog can include one or more waveforms of arbitrary shape and frequency. For the purposes of semiconductor and cryogenic electronic device testing and operations, it is useful to generate complex waveforms created from these arbitrary shapes and frequencies. The complex waveforms permit parameter extraction and subsequent higher performance operation in regimes that are unobtainable with conventional digital logic resulting in improved performance of the semiconductor and cryogenic devices. The term "cryogenics" refers generally to the branches of physics and engineering that involve the study of very low temperatures, how to produce them, and how materials behave at those temperatures. A cryogenic electronic device is operable to transfer electronic signals into and out of one or more circuits at low, superconducting temperatures. When the analog output is interrupted, e.g., to switch between two or more waveforms, it can be challenging to restore the output of a previously output waveform and ensure that the phase remains continuous as to where the waveform would have been with respect to phase absent the interruption. In a phase sensitive system, a phase discontinuity can have adverse effects.

Turning now to an overview of the aspects of the invention, one or more embodiments of the invention address the above-described shortcomings of the prior art by direct digital synthesis for phase continuous signal generation. In embodiments, a waveform generator stores a plurality of waveform vectors and outputs a selected waveform vector in digital form. A digital-to-analog converter converts the selected waveform vector from a digital value to an analog signal responsive to a reference clock. A controller can maintain phase continuity of the analog signal when an output of the analog signal is interrupted and restored. As additional technical benefits, a wide range of frequencies can be supported while providing analog signal phase continuity. Further, multiple waveforms can be combined while maintaining phase continuity.

More specifically, the above-described aspects of the invention address the shortcomings of the prior art by determining a closest frequency that can achieve phase continuity based on a desired frequency, a reference clock frequency, and a number of waveform vectors to store a digitized version of one or more waveforms. One or more modulo counters can be configured to run and reset/wrap-around to repeatedly step through the waveform vectors. When output of the resulting analog signal is not needed, the modulo counters can continue to run such that the phase position is tracked while the analog output is disabled or not utilized. When the analog output is to be restored, the current value of the one or more modulo counters can be used to select the proper waveform vector that maintains phase continuity with the last output of the same waveform.

Figure 1:
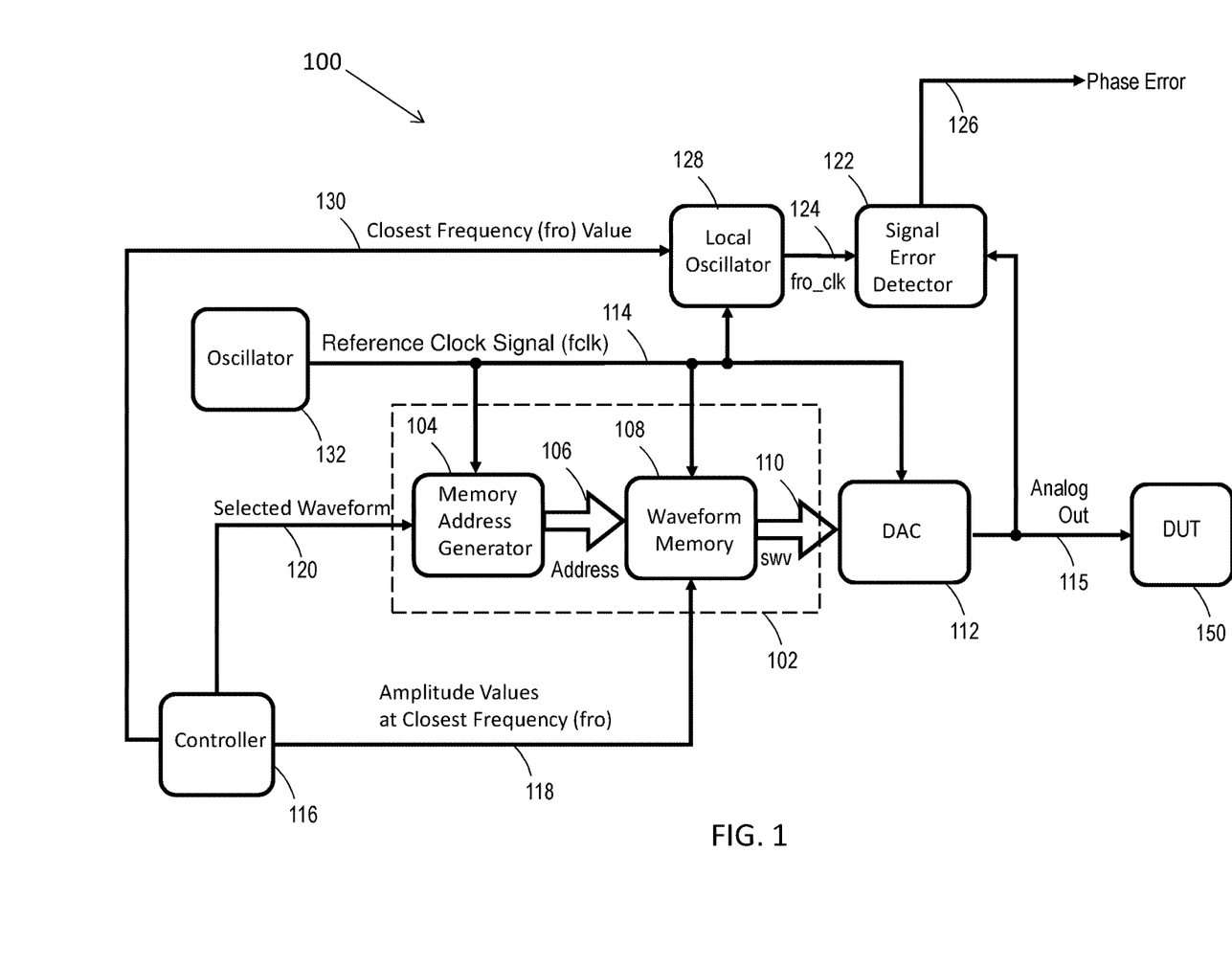
FIG. 1 depicts a schematic of a direct digital synthesis system according to one or more embodiments.

Turning now to a more detailed description of aspects of the present invention, FIG. 1 depicts a schematic diagram of a direct digital synthesis system 100 according to embodiments of the invention. The direct digital synthesis system 100 includes a waveform generator 102 with a memory address generator 104 operable to output an address 106. The waveform generator 102 also includes a waveform memory 108 operable to store a plurality of waveform vectors and output a selected waveform vector 110. The direct digital synthesis system 100 also includes at least one digital-to-analog converter 112 operable to convert the selected waveform vector 110 from a digital value to an analog signal 115 responsive to a reference clock 114. A controller 116 is operable to maintain phase continuity of the analog signal 115 when an output of the analog signal 115 is interrupted and restored. An output of the analog signal 115 can be interrupted due to on/off switching and/or switching between multiple waveforms. The analog signal 115 can be provided to a device under test 150 configured to operate according to at least one mode in response to a phase of the analog signal 115. For example, the device under test 150 can be a communication apparatus, a storage apparatus, a computational apparatus, an actuator, a sensor, a semiconductor and cryogenic electronic device, and/or other phase sensitive device.

The controller 116 can receive a desired frequency value and determine a closest frequency for encoding a waveform in the waveform vectors based on a storage capacity of the waveform memory 108, the desired frequency of the waveform, and a clock frequency of the reference clock 114. The controller 116 can select the closest frequency to eliminate a phase discontinuity between a last waveform vector and a first waveform vector in the waveform memory 108. An example of a process for determining the closest frequency is further provided herein with respect to FIG. 6. The controller 116 can determine corresponding amplitude values 118 at the closest frequency and encode the amplitude values 118 into the waveform memory 108. For example, waveform vectors that represent a digitized version of a waveform can be created as amplitude (e.g., voltage) values 118 based on a sampling rate, as driven by the reference clock 114, a desired resolution, and frequency. The waveform memory 108 can hold waveform vectors for multiple waveforms that may be kept in separate memory locations or combined. When a particular waveform is desired to be output, the controller 116 can use the memory address generator 104 select the address 106 in the waveform memory 108 to output as a selected waveform vector 110 based on identifying a selected waveform 120. For example, there may be multiple counters in the memory address generator 104 that are configurable by the controller 116, and the selected waveform 120 identifies which counter to use for generating the address 106 to select a corresponding waveform vector from the waveform memory 108.

The direct digital synthesis system 100 can also include a signal error detector 122 operable to mix the analog signal 115 with a local oscillator output 124 operating at the closest frequency to determine a phase error 126 of the analog signal 115. A local oscillator 128 generates the local oscillator output 124 as a clock signal operating at the closest frequency. The local oscillator 128 can receive a closest frequency value 130 from the controller 116 and the reference clock 114 from an oscillator 132. The reference clock 114 may also be provided to the memory address generator 104, waveform memory 108, and digital-to-analog converter 112. The local oscillator 128 may use a phase locked loop or other means to rescale the clock frequency of the reference clock 114 to the closest frequency value 130 to produce the local oscillator output 124. When the local oscillator output 124 is mixed with the analog signal 115, the phase error 126 can appear as a phase jump. If the phase error 126 is above an error threshold, the controller 116 may re-evaluate the closest frequency value 130 and determine if an adjustment can be made, such as altering the number of waveform vectors used and re-computing the amplitude values 118.

Although depicted separately, elements of the direct digital synthesis system 100 can be combined or further subdivided. The controller 116 can be implemented using one or more processing circuits, such as a processor, a microcontroller, a digital signal processor, a graphics processing unit, an application specific integrated circuit, a programmable gate array, or other device known in the art. The controller 116 provides control signals to various hardware elements of the direct digital synthesis system 100. The controller 116 can include additional interfaces not depicted in FIG. 1, such as communication buses, input/output interfaces, power supply controls, and the like.

Figure 2:
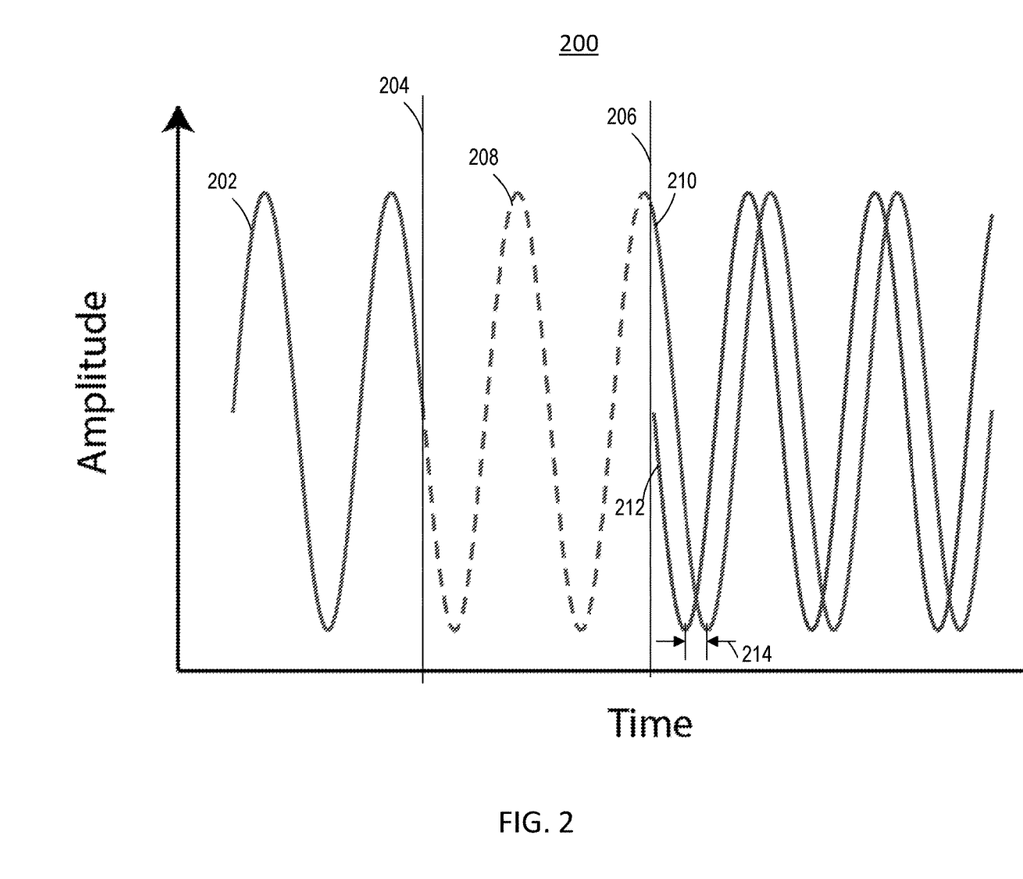
FIG. 2 depicts waveform plots according to one or more embodiments.

To better illustrate the phase effects of waveform segment interruption, FIG. 2 depicts waveform plots 200. A waveform 202 can be interrupted at time 204 and restored at time 206. Waveform segment 208 depicts where the waveform 202 would have been in time if it had not been interrupted/disabled. By tracking what would have happened between time 204 and time 206, when the waveform 202 is restored (output again), phase continuity is maintained in waveform segment 210 that continues forward in time after time 206. In contrast, if at time 204 when the waveform 202 was interrupted, the waveform 202 was simply re-enabled at time 206 (as if the time gap between times 204 and 206 did not occur), a resulting waveform segment 212 going forward would have a phase shift 214 with respect to waveform segment 210. If the device under test 150 of FIG. 1 is phase sensitive, the phase shift 214 can produce undesirable results. Thus embodiments can continue tracking the expected phase position of the waveform 202 during interruptions in output of the waveform 202 such that phase continuity is maintained in waveform segment 210 when output of the waveform 202 resumes.

Figure 3:
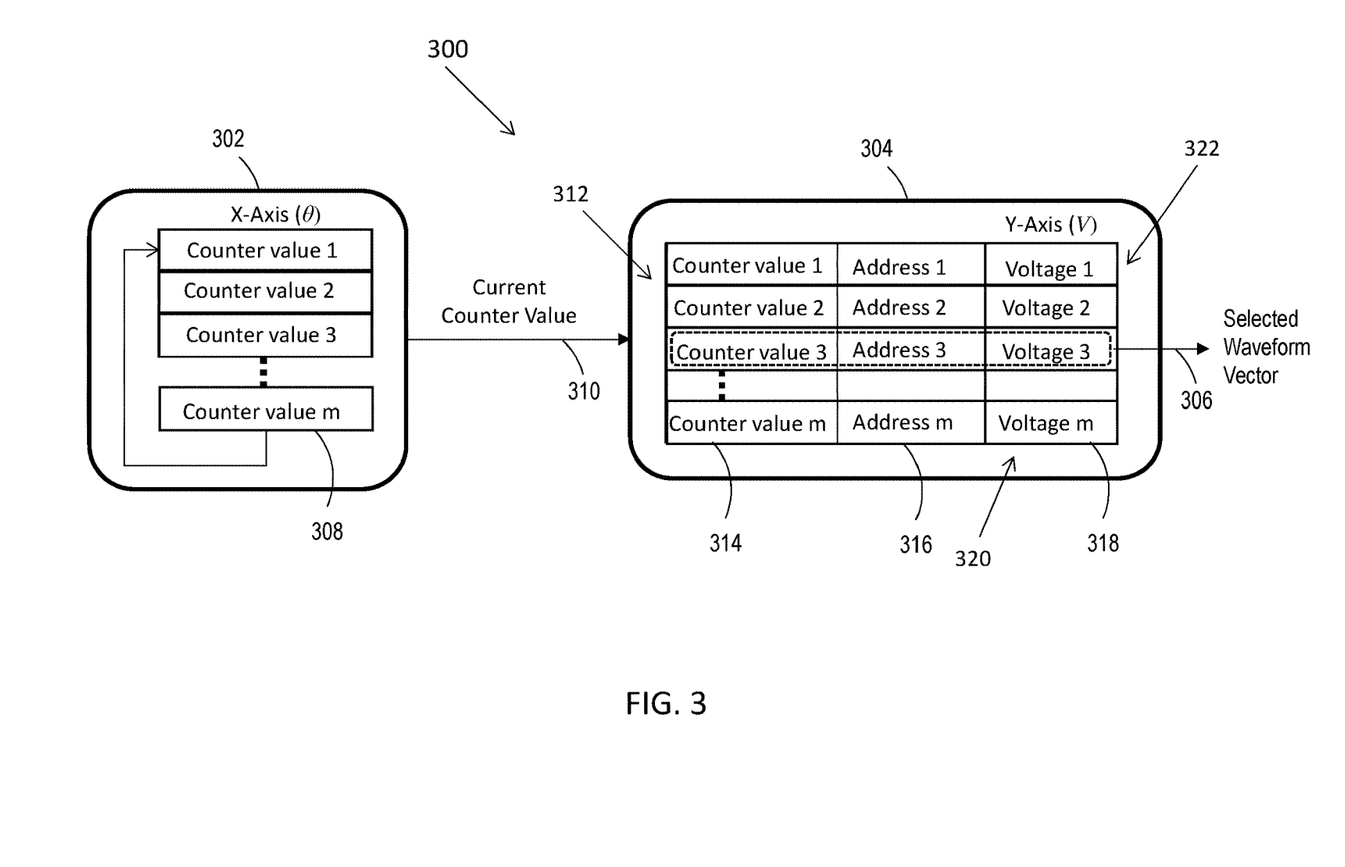
FIG. 3 depicts a schematic of a waveform generator according to one or more embodiments.

FIG. 3 depicts a schematic of a waveform generator 300 according to one or more embodiments as an example of the waveform generator 102 of FIG. 1. FIG. 3 depicts an example of a memory address generator 302 as an embodiment of the memory address generator 104 of FIG. 1. A waveform memory 304 is an example of the waveform memory 108 of FIG. 1 and is operable to output a selected waveform vector 306 as a voltage value for conversion by the digital-to-analog converter 112 of FIG. 1 into the analog signal 115 for the device under test 150 of FIG. 1. The memory address generator 302 can include at least one modulo counter 308 operable to count and reset based on a periodicity of a desired waveform. The selected waveform vector 306 is selected from the waveform memory 304 based on a value 310 of the at least one modulo counter 308. For example, modulo counter 308 can count between values of zero and m−1 and then wrap back to zero, where the value of "m" may be a variable configured to match the number of waveform vectors 312 used in the waveform memory 304 to represent discrete points on a waveform. Modulo counter 308 can be initialized at a desired value and may increment (or decrement) at regular intervals as driven by the reference clock 114 of FIG. 1. The value 310 can be mapped to a counter value 314 equivalent location with a corresponding address 316 and waveform vector 318 selected from the plurality of waveform vectors 312. For example, if the value 310 corresponds to the third entry in the waveform memory 304, then the selected waveform vector 306 may be a voltage value of the third waveform vector 318. Thus, the modulo counter 308 can be used to determine the address 316 in the waveform memory 304 and identify the selected waveform vector 306 from the waveform vectors 312 based on the address 316.

Although depicted in FIG. 3, the waveform memory 304 need not hold actual values of the counter value 314 and address 316 values; rather, the counter value 314 and/or address 316 values can be inherently encoded based on a base address location of the waveform vectors 312 in the waveform memory 304. Address 316 values may be stored where, for example, the waveform vectors 312 are non-contiguously distributed within the waveform memory 304.

The controller 116 of FIG. 1 can maintain phase continuity of the analog signal 115 by allowing the modulo counter 308 to continue counting while the output of the analog signal 115 is interrupted. The output of the analog signal 115 can be interrupted by blocking the selected waveform vector 306 from reaching the digital-to-analog converter 112, by blocking the value 310 of the modulo counter 308 from reaching the waveform memory 304, or by other means. Continuity is also maintained by encoding the waveform vectors 312 with phase continuity between a last waveform vector 320 and a first waveform vector 322 such that when the modulo counter 308 resets and transitions from selecting the last waveform vector 320 to selecting the first waveform vector 322, phase continuity is maintained.

Figure 4:
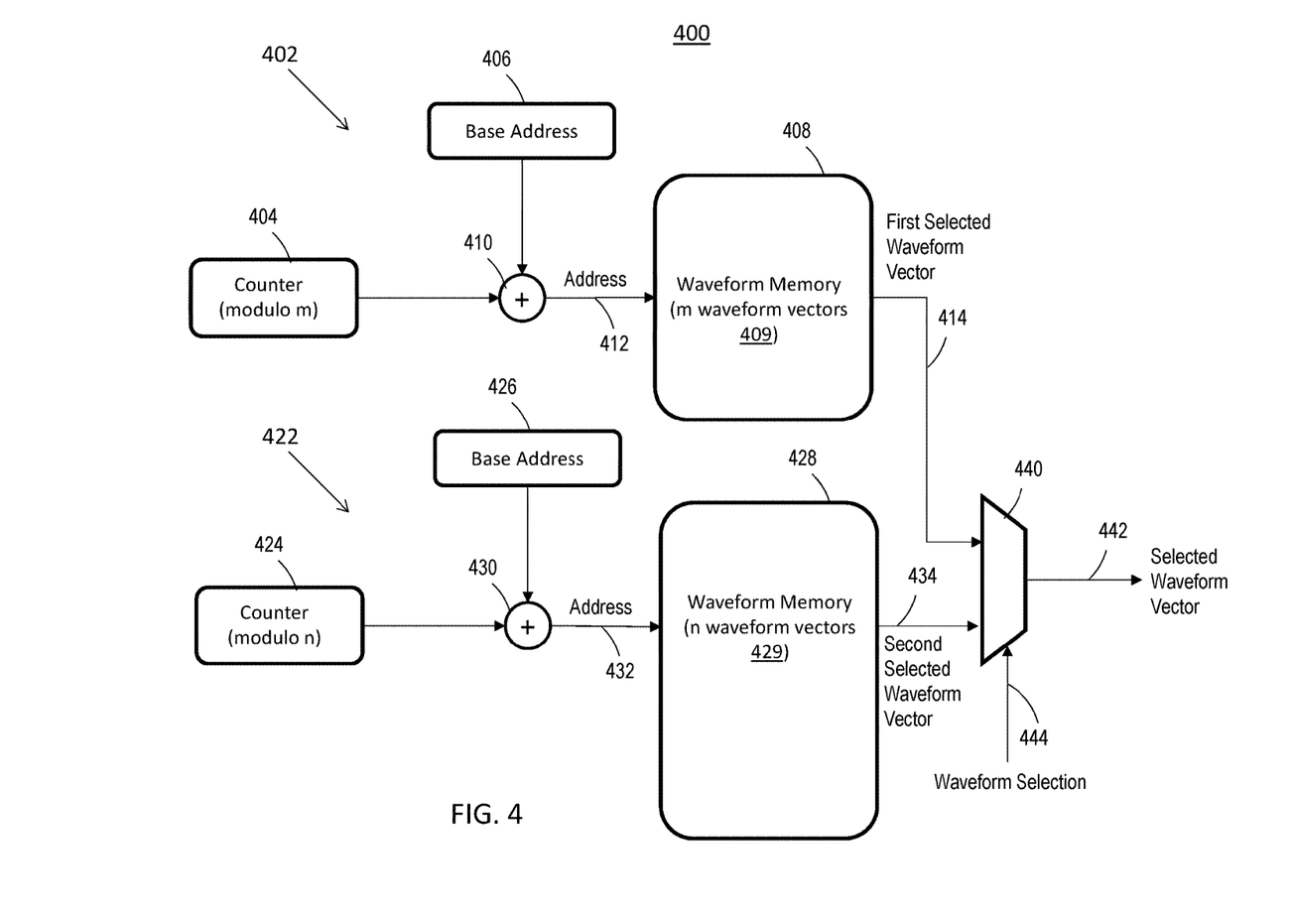
FIG. 4 depicts a schematic of a group of waveform generators according to one or more embodiments.

FIG. 4 depicts a schematic of a group 400 of waveform generators 402, 422 according to one or more embodiments. As depicted in the example of FIG. 4, a first waveform generator 402 and a second waveform generator 422 can be included in the direct digital synthesis system 100 of FIG. 1. The first waveform generator 402 includes a first modulo counter 404, a first base address 406, and a first waveform memory 408 operable to store a first plurality of waveform vectors 409. In the example of FIG. 4, the first modulo counter 404 is configured as a modulo-m counter, and the first waveform memory 408 is configured to store m waveform vectors 409. A current value of the first modulo counter 404 can be summed 410 with the first base address 406 to determine an address 412 to select one of the waveform vectors 409 as a first selected waveform vector 414. Similarly, the second waveform generator 422 includes a second modulo counter 424, a second base address 426, and a second waveform memory 428 operable to store a second plurality of waveform vectors 429. In the example of FIG. 4, the second modulo counter 424 is configured as a modulo-n counter, and the second waveform memory 428 is configured to store n waveform vectors 429. A current value of the second modulo counter 424 can be summed 430 with the second base address 426 to determine an address 432 to select one of the waveform vectors 429 as a second selected waveform vector 434. As can be seen in the example of FIG. 4, the second waveform generator 422 is configurable to use a different number of number of vectors for the second plurality of waveform vectors 429 than the waveform vectors 409 of the first waveform memory 408 (e.g., n values vs. m values).

The controller 116 of FIG. 1 is operable to control a multi-waveform selector 440 to select between providing the first selected waveform vector 414 and the second selected waveform vector 434 as a selected waveform vector 442 to the digital-to-analog converter 112 based on a waveform selection value 444. While the first selected waveform vector 414 is used as the selected waveform vector 442, the second modulo counter 424 continues counting to maintain phase continuity of one or more waveforms encoded in the waveform vectors 429. Thus, when the second selected waveform vector 434 is used as the selected waveform vector 442, the time gap since the last time that the second selected waveform vector 434 was used as the selected waveform vector 442 is accounted for to ensure that a phase jump in the second selected waveform vector 434 does not occur. Similarly, when the second selected waveform vector 434 is used as the selected waveform vector 442, the first modulo counter 404 continues counting to maintain phase continuity of one or more waveforms encoded in the waveform vectors 409.

Figure 5:
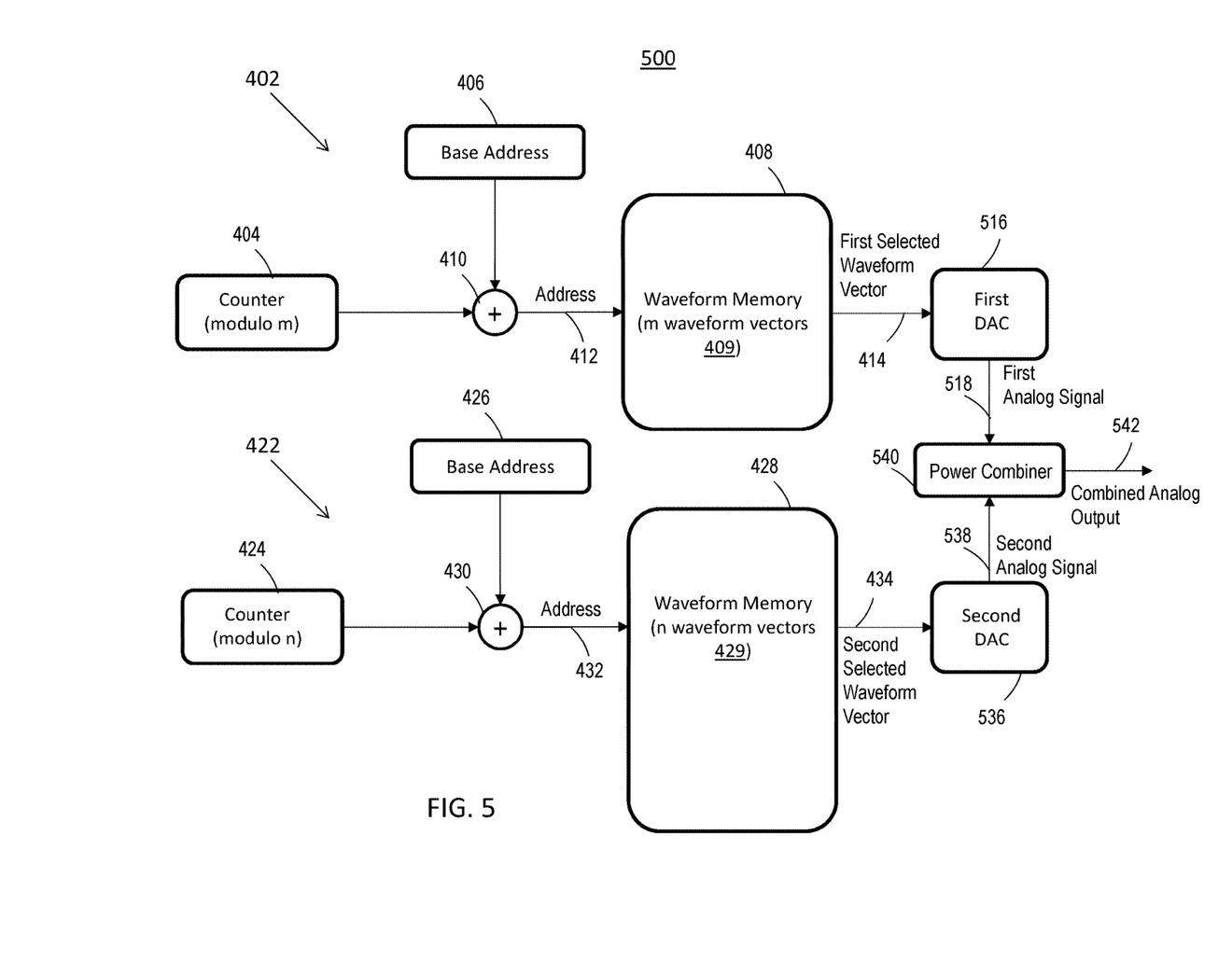
FIG. 5 depicts a schematic of a group of waveform generators according to one or more embodiments.

FIG. 5 depicts an alternate embodiment of the group 400 of waveform generators 402, 422 of FIG. 4 as a waveform summing configuration 500 rather than a waveform switching configuration. In the example of FIG. 5, the first selected waveform vector 414 output from the first waveform generator 402 is provided to a first digital-to-analog converter 516 that is independent of a second digital-to-analog converter 536 that receives the second selected waveform vector 434 output from the second waveform generator 422. A first analog signal 518 from the first digital-to-analog converter 516 is provided to a power combiner 540, and a second analog signal 538 from the second digital-to-analog converter 536 is provided to the power combiner 540. The power combiner 540 performs an analog summation of the first analog signal 518 and the second analog signal 538 to produce a combined analog output 542 for the device under test 150 of FIG. 1. The waveform summing configuration 500 enables more complex signal summing in an analog format rather than a digital format. Further, the waveform memories 408, 428 may each contain one or more overlaid waveforms to support both digital waveform summation and analog waveform summation.

Figure 6:
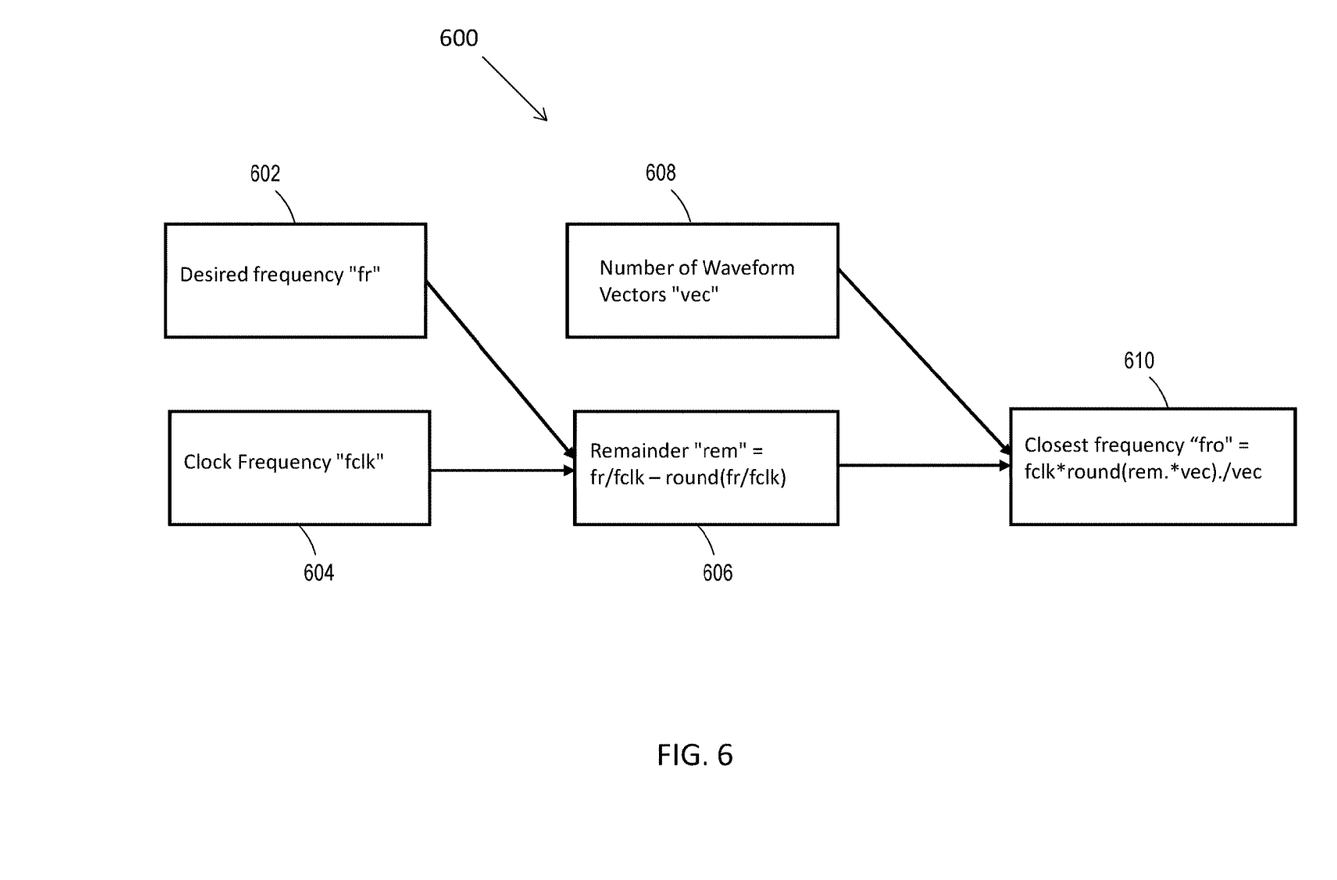
FIG. 6 depicts a process of determining a closest frequency according to one or more embodiments.

FIG. 6 depicts a process 600 of determining a closest frequency according to one or more embodiments. At block 602, a desired frequency is received as an input, for instance, at the controller 116 of FIG. 1. At block 604, the clock frequency of the reference clock 114 of FIG. 1 is determined. The clock frequency can be determined as a look-up value of a known or computed value depending, for instance, on whether the clock frequency is fixed or can be adjusted. At block 606, a remainder value can be determined, for instance, by the controller 116. A clock ratio can be computed as the desired frequency divided by the reference clock frequency, and the remainder can be computed as a difference between clock ratio and a value of the clock ratio rounded to the nearest integer. Other approaches to determine the remainder value are also contemplated. At block 608, a number of waveform vectors of the waveform memory 108 are determined. The number of waveform vectors may be limited by the size or available space in the waveform memory 108. At block 610, the closest frequency can be determined, for instance, by the controller 116. As one example, the closest frequency can be computed based on the clock frequency of the reference clock 114, the remainder value, and the number of waveform vectors. For instance, an integer rounded value of the remainder value multiplied by the number of waveform vectors can be computed, and the closest frequency can be determined as the clock frequency of the reference clock 114 multiplied by the rounded integer value and divided by the number of waveform vectors. In some embodiments, the result of the closest frequency computation can be checked to ensure that the result is achievable and further adjusted as needed. For instance, the closest frequency may be higher or lower than the desired frequency, and an alternate calculation may be performed to determine whether it is preferable to select a frequency that is higher or lower than the desired frequency as the closest frequency. As an example, alternate calculations may use a floor function to always force rounding down or a ceiling function to always force rounding up.

Although the process 600 of FIG. 6 depicts an example for determining the closest frequency, it will be understood that other steps and/or alternate techniques can be used. For instance, a lookup table or equations can be used to map desired frequencies to corresponding closest frequencies. Further, checks can be performed to determine whether the desired frequency can provide phase continuity by modifying the number of vectors used for the waveform in the waveform memory 108. Additionally, a frequency mapping table may be constructed to add new values of the closest frequencies as new values of the desired frequencies are received.

Figure 7:
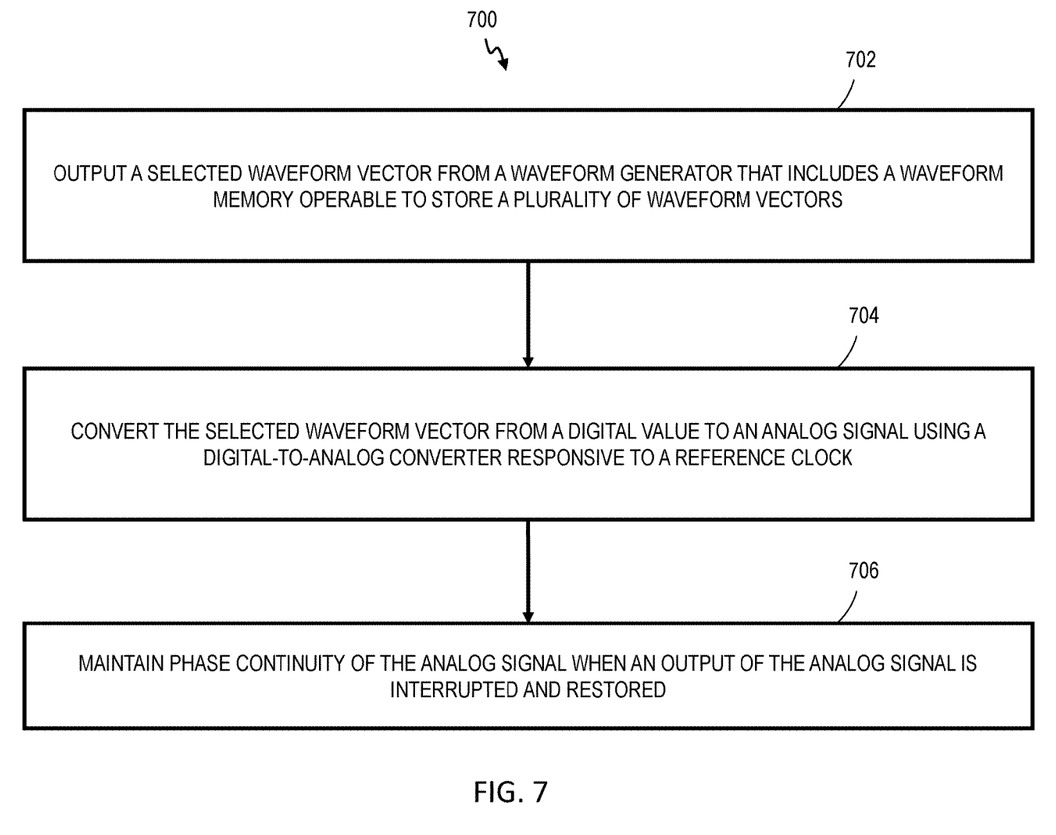
FIG. 7 depicts a flow chart of a method of direct digital synthesis according to embodiments of the present invention.

FIG. 7 depicts a flow chart 700 of a method of direct digital synthesis according to embodiments of the present invention and with reference to FIGS. 1-7. Initially, the closest frequency can be determined using, for example, the process 600 of FIG. 6 or an alternate approach. The controller 116 is operable to determine the closest frequency for encoding a waveform in waveform vectors based on a storage capacity of waveform memory 108, a desired frequency of the waveform, and a clock frequency of the reference clock 114. The closest frequency is selected to eliminate a phase discontinuity between a last waveform vector and a first waveform vector in the waveform memory 108. The waveform can be encoded by the controller 116 in the waveform vectors based on the closest frequency. As a simple example, to encode 256 waveform vectors in the waveform memory, the controller can step through 0 to 255 values of X scaled for time increments, determine an amplitude value of sin(2*pi*X*closest frequency/clock frequency of the reference clock), and rescale as voltage levels. Other mathematical functions can be used to create various arbitrary waveforms, including multiple overlaid (e.g., summed) waveforms in the waveform vectors. As a further example, the waveforms can include complex waveforms that permit parameter extraction and subsequent higher performance operation in regimes that are unobtainable with conventional digital logic resulting in improved performance of one or more semiconductor and cryogenic devices as the device under test 150. For instance, the waveform vectors of the waveform memory 108 can populated with one or more complex waveforms that permit parameter extraction from one or more semiconductor and cryogenic devices as the device under test 150.

At block 702, a selected waveform vector 110 is output from a waveform generator 102 that includes a waveform memory 108 operable to store a plurality of waveform vectors. The selected waveform vector 110 can be selected from the waveform memory 108 based on a value of at least one modulo counter 308 in the memory address generator 104. The at least one modulo counter 308 can be controlled, for instance, by the controller 116, to count and reset based on a periodicity of a desired waveform. Modulo counters 308 can be free-running counters that are programmed to wrap around upon reaching a desired count. The memory address generator 104 can determine an address 106 in the waveform memory 108 based on the at least one modulo counter 308. The selected waveform vector 110 from the waveform vectors can be identified based on the address 106. At block 704, the selected waveform vector 110 is converted from a digital value to an analog signal 115 using a digital-to-analog converter 112 responsive to a reference clock 114.

At block 706, phase continuity of the analog signal 115 is maintained when an output of the analog signal 115 is interrupted and restored. For example, phase continuity of the analog signal 115 can be maintained by allowing the at least one modulo counter 308 to continue counting while the output of the analog signal 115 is interrupted. Interruptions of the output of a particular analog signal 115 can occur as on/off transitions or switching between multiple analog signals. The analog signal 115 can be output to a device under test 150 configured to operate according to at least one mode in response to a phase of the analog signal 115. In some embodiments, the analog signal 115 can be controlled to perform device testing and/or operation of one or more semiconductor and cryogenic electronic devices as the device under test 150.

To determine a phase error 126, the signal error detector 122 can mix the analog signal 115 with a local oscillator output 124 operating at the closest frequency and determine the phase error 126 of the analog signal 115 based on a result of the mixing. For example, a phase error 126 can appear as phase jumps in the mixing output.

In some embodiments, a selection can be performed between multiple waveforms. For instance, a second selected waveform vector 434 from a second waveform generator 422 can be output to a multi-waveform selector 440, where the controller 116 can configure the multi-waveform selector 440 to select between providing the first selected waveform vector 414 and the second selected waveform vector 434 to the digital-to-analog converter 112. The second waveform generator 422 can be configurable to use a different number of number of vectors for the second plurality of waveform vectors 429 than the waveform vectors 409 of the first waveform memory 408.

As another example, multiple waveforms can overlap in time, for instance, by populating the waveform vectors with a combination of amplitude values of two or more waveforms overlaid. The overlaid waveforms can include more than one period of a highest frequency waveform of the waveforms. For instance, if a first waveform includes M waveform vectors and a second waveform includes N waveform vectors, the combination may include P waveform vectors, where P is greater than M and N. As an example, if M is 20 and N is 30, the value of P can be 60, with three cycles of the first waveform overlaid (e.g., summed) with two cycles of the second waveform.

In another example of merging multiple waveforms, a second selected waveform vector 434 can be output from a second waveform generator 422, and the second selected waveform vector 434 can be converted from a second digital value to a second analog signal 538 using a second digital-to-analog converter 536. A power combiner 540 can combine the first analog signal 518 and the second analog signal 538 to produce a combined analog output 542 to a device under test 150.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A direct digital synthesis system comprising:
    a waveform generator comprising a waveform memory operable to store a plurality of waveform vectors and output a selected waveform vector;
    a digital-to-analog converter operable to convert the selected waveform vector from a digital value to an analog signal responsive to a reference clock;
    a controller operable to maintain phase continuity of the analog signal when an output of the analog signal is interrupted and restored; and
    a signal error detector configured to determine a phase error of the analog signal with respect to a local oscillator driven by the reference clock.

2. The direct digital synthesis system of claim 1, wherein the controller is operable to determine a closest frequency for encoding a waveform in the waveform vectors based on a storage capacity of the waveform memory, a desired frequency of the waveform, and a clock frequency of the reference clock, wherein the closest frequency is selected to maintain phase continuity between a last waveform vector and a first waveform vector in the waveform memory and scale the desired frequency of the waveform with respect to a number of the waveform vectors and the clock frequency of the reference clock through the local oscillator.

3. The direct digital synthesis system of claim 2, wherein the signal error detector is operable to mix the analog signal with an output of the local oscillator operating at the closest frequency to determine the phase error of the analog signal and trigger an adjustment to the waveform generator based on comparing the phase error to an error threshold.

4. The direct digital synthesis system of claim 1, further comprising:
    at least one modulo counter operable to count and reset based on a periodicity of a desired waveform, wherein the selected waveform vector is selected from the waveform memory based on a value of the at least one modulo counter, wherein the controller maintains phase continuity of the analog signal by allowing the at least one modulo counter to continue counting while the output of the analog signal is interrupted, and the at least one modulo counter is used to determine an address in the waveform memory and identify the selected waveform vector from the waveform vectors based on the address.

5. The direct digital synthesis system of claim 1, wherein the analog signal is controlled to perform device testing and/or operation of one or more semiconductor and cryogenic electronic device.

6. The direct digital synthesis system of claim 1 wherein the waveform vectors are populated with one or more complex waveforms that permit parameter extraction from one or more semiconductor and cryogenic devices.

7. The direct digital synthesis system of claim 1, further comprising:
- a second waveform generator comprising a second waveform memory operable to store a second plurality of waveform vectors and output a second selected waveform vector, wherein the second waveform generator is configurable to use a different number of number of vectors for the second plurality of waveform vectors than the waveform vectors of the waveform memory; and
- a multi-waveform selector operable to select between providing the selected waveform vector and the second selected waveform vector to the digital-to-analog converter.

8. The direct digital synthesis system of claim 1, wherein the waveform vectors comprise a combination of amplitude values of two or more waveforms overlaid and include more than one period of a highest frequency waveform of the two or more waveforms.

9. The direct digital synthesis system of claim 1, further comprising:
- a second waveform generator comprising a second waveform memory operable to store a second plurality of waveform vectors and output a second selected waveform vector;
- a second digital-to-analog converter operable to convert the second selected waveform vector from a second digital value to a second analog signal; and
- a power combiner operable to combine the analog signal and the second analog signal and produce a combined analog output to a device under test.

10. The direct digital synthesis system of claim 1, wherein the analog signal is output to a device under test configured to operate according to at least one mode in response to a phase of the analog signal.

11. A method for direct digital synthesis, the method comprising:
- outputting a selected waveform vector from a waveform generator comprising a waveform memory operable to store a plurality of waveform vectors;
- converting the selected waveform vector from a digital value to an analog signal using a digital-to-analog converter responsive to a reference clock;
- maintaining phase continuity of the analog signal when an output of the analog signal is interrupted and restored; and
- determining a phase error of the analog signal with respect to a local oscillator driven by the reference clock.

12. The method of claim 11, further comprising:
- determining a closest frequency for encoding a waveform in the waveform vectors based on a storage capacity of the waveform memory, a desired frequency of the waveform, and a clock frequency of the reference clock, wherein the closest frequency is selected to maintain phase continuity between a last waveform vector and a first waveform vector in the waveform memory and scale the desired frequency of the waveform with respect to a number of the waveform vectors and the clock frequency of the reference clock through the local oscillator; and
- encoding the waveform in the waveform vectors based on the closest frequency.

13. The method of claim 12, further comprising:
- mixing the analog signal with an output of the local oscillator operating at the closest frequency, wherein the phase error of the analog signal is determined based on a result of the mixing; and
- triggering an adjustment to the waveform generator based on comparing the phase error to an error threshold.

14. The method of claim 11, further comprising:
- controlling at least one modulo counter to count and reset based on a periodicity of a desired waveform, wherein the selected waveform vector is selected from the waveform memory based on a value of the at least one modulo counter;
- allowing the at least one modulo counter to continue counting while the output of the analog signal is interrupted to maintain phase continuity of the analog signal;
- determining an address in the waveform memory based on the at least one modulo counter; and
- identifying the selected waveform vector from the waveform vectors based on the address.

15. The method of claim 11, further comprising:
- controlling the analog signal to perform device testing and/or operation of one or more semiconductor and cryogenic electronic device.

16. The method of claim 11, further comprising:
- populating the waveform vectors with one or more complex waveforms that permit parameter extraction from one or more semiconductor and cryogenic devices.

17. The method of claim 11, further comprising:
- outputting a second selected waveform vector from a second waveform generator comprising a second waveform memory operable to store a second plurality of waveform vectors, wherein the second waveform generator is configurable to use a different number of number of vectors for the second plurality of waveform vectors than the waveform vectors of the waveform memory; and
- selecting between providing the selected waveform vector and the second selected waveform vector to the digital-to-analog converter.

18. The method of claim 11, further comprising:
- populating the waveform vectors with a combination of amplitude values of two or more waveforms overlaid and including more than one period of a highest frequency waveform of the two or more waveforms.

19. The method of claim 11, further comprising:
- outputting a second selected waveform vector from a second waveform generator comprising a second waveform memory operable to store a second plurality of waveform vectors;
- converting the second selected waveform vector from a second digital value to a second analog signal using a second digital-to-analog converter; and
- combining the analog signal and the second analog signal at a power combiner to produce a combined analog output to a device under test.

20. The method of claim 11, further comprising:
- outputting the analog signal to a device under test configured to operate according to at least one mode in response to a phase of the analog signal.

21. A computer program product comprising a computer readable storage medium having program instructions embodied therewith, the program instructions executable by processing circuitry to cause the processing circuitry to perform:
- controlling a waveform generator to output a selected waveform vector, the waveform generator comprising a waveform memory operable to store a plurality of waveform vectors;
- controlling a digital-to-analog converter to convert the selected waveform vector from a digital value to an analog signal responsive to a reference clock;
- maintaining phase continuity of the analog signal when an output of the analog signal is interrupted and restored; and
- determining a phase error of the analog signal with respect to a local oscillator driven by the reference clock.

22. The computer program product of claim 21, wherein the program instructions executable by processing circuitry further cause the processing circuitry to perform:
- determining a closest frequency for encoding a waveform in the waveform vectors based on a storage capacity of the waveform memory, a desired frequency of the waveform, and a clock frequency of the reference clock, wherein the closest frequency is selected to maintain phase continuity between a last waveform vector and a first waveform vector in the waveform memory and scale the desired frequency of the waveform with respect to a number of the waveform vectors and the clock frequency of the reference clock through the local oscillator; and
- encoding the waveform in the waveform vectors based on the closest frequency.

23. The computer program product of claim 21, wherein the program instructions executable by processing circuitry further cause the processing circuitry to perform:
- controlling at least one modulo counter to count and reset based on a periodicity of a desired waveform, wherein the selected waveform vector is selected from the waveform memory based on a value of the at least one modulo counter.

24. The computer program product of claim 23, wherein the program instructions executable by processing circuitry further cause the processing circuitry to perform:
- controlling the at least one modulo counter to continue counting while the output of the analog signal is interrupted to maintain phase continuity of the analog signal;
- determining an address in the waveform memory based on the at least one modulo counter; and
- identifying the selected waveform vector from the waveform vectors based on the address.

25. The computer program product of claim 21, wherein the program instructions executable by processing circuitry further cause the processing circuitry to perform:
- selectively combining or switching between two or more waveforms to provide an analog output to a device under test; and
- controlling the analog signal to perform device testing and/or operation of one or more semiconductor and cryogenic electronic device, wherein the waveform vectors are populated with one or more complex waveforms that permit parameter extraction from the one or more semiconductor and cryogenic devices.

\* \* \* \* \*